United States Patent [19]

Scharlacken et al.

[11] Patent Number: 4,759,108
[45] Date of Patent: Jul. 26, 1988

[54] TOOLING APPARATUS AND METHOD FOR ROBOTIC OR LIKE MECHANIZED INSTALLATION OF ROCKER ARM ASSEMBLIES

[75] Inventors: John W. Scharlacken, Orleans, Mass.; Glenn M. Krcek, Sterling Heights, Mich.

[73] Assignee: General Motors Corporation, Detroit, Mich.

[21] Appl. No.: 56,225

[22] Filed: Jun. 1, 1987

[51] Int. Cl.⁴ .............................................. B23P 13/00
[52] U.S. Cl. ................................. 29/156.7 R; 29/407; 29/707; 29/709; 294/119.1; 414/736; 901/41
[58] Field of Search ................ 29/156.4 R, 156.5 R, 29/156.7 R, 252, 407, 705, 709, 720; 294/119.1; 414/736; 901/41

[56] References Cited

U.S. PATENT DOCUMENTS 4,484,855 11/1984 Inaba et al. ..................... 414/736

FOREIGN PATENT DOCUMENTS 2707161 9/1977 Fed. Rep. of Germany ........ 29/407
2527968 12/1983 France ............................. 294/119.1
716809 2/1980 U.S.S.R. ............................. 294/119.1

Primary Examiner—P. W. Echols
Assistant Examiner—Andrew E. Rawlins
Attorney, Agent, or Firm—Ernest E. Helms

[57] ABSTRACT

The present invention provides an apparatus and method of utilization of the same of tooling for a robot or the like for installing rocker arm assemblies to the cylinder banks of an engine. A preferred embodiment of the present invention includes jaws to grip the rocker arm assembly, a bolt runner to torque the rocker arm bolt and means to angularly float the jaws, allowing the rocker arm assembly to align itself with the engine cylinder bank push rod and valve spring.

9 Claims, 4 Drawing Sheets

4,759,108

TOOLING APPARATUS AND METHOD FOR ROBOTIC OR LIKE MECHANIZED INSTALLATION OF ROCKER ARM ASSEMBLIES

FIELD OF THE INVENTION

The field of the present invention is that of automated installation of rocker arm assemblies to cylinder banks of internal combustion engines.

DISCLOSURE STATEMENT

Presently, the installation of rocker arm assemblies to the cylinder banks of internal combustion engines is a manual operation. The operator manually takes one or more rocker arm assemblies (each assembly consisting of a rocker arm, a pivot joint and a bolt) and then torques the bolt into the threaded aperture of the engine cylinder bank with a hand held air tool. The shortcoming of the present method is that it is labor intensive.

There are several obstacles which must be overcome in order to automate the installation of rocker arm assemblies. An casual observation of an engine block cylinder bank with installed rocker arm assemblies appears to illustrate the rocker arms being orientated along a line which is perpendicular to the axial center line of the cam shaft or the engine. However, the above observation is not correct in most cases. The rocker arms by design are mounted to the engine cylinder bank slightly angularly offset from being perpendicular with the axial center line of the crankshaft. Complicating the above situation even further, the angular offset of the rocker arm assemblies by design criteria often varies from one rocker arm to another. Therefore, any attempt to automate the installation of the rocker arm assemblies must accommodate for the different angular offsets of the rocker arm assemblies. Another obstacle encountered in the installation of the rocker arm assemblies is that the spacing between the rocker arm assemblies for a given cylinder is not always constant but can vary for the different cylinders on a given engine.

The rocker arm assembly is installed with a dimple end of the rocker arm being placed over the push rod and the other end of the rocker arm being placed over the valve spring. It is preferable to provide an installation apparatus and method which can accommodate the push rods for a given engine being at various heights. If the installation apparatus cannot accommodate the push rods being at different heights, the cam shaft of the engine must then be rotated so that the push rods will be at the same height. Rotation of the cam shaft would require another mechanical operations and increases the cost of any automated installation process.

SUMMARY OF THE INVENTION

To overcome the above noted and other problems, the present invention is brought forth. The present invention provides a tooling device and method of utilization of the same for a robot or like for picking up the rocker arm assembly from a loading station. The tooling device also provides a bolt runner to threadably insert the bolt into the engine cylinder bank. The inventive tooling device also provides angular floating to allow the rocker arm assembly to align itself with the push rod and the valve spring of the engine. A preferred embodiment of the present invention allows assembly of more than one rocker arm assembly at a time.

It is an object of the present invention to provide a tooling device for robot or the like and a method of utilization of the same allowing for automated installation of rocker arm assemblies to the cylinder bank of an engine.

It is an object of the present invention to provide a tooling device for a robot or like to install a rocker arm assembly onto an engine cylinder bank with a valve spring, a push rod and an aperture, the rocker arm assembly including a rocker arm, pivot joint and bolt, the tooling device including a frame having means of connection with the robot or like, a first jaw connected to the frame for gripping a first end of the rocker arm, a second jaw movable with respect to the first jaw for gripping an end of the rocker arm opposite the first end, a bolt runner connected with the frame for turning the respective bolt in a first axis, and floating means allowing the frame to angularly float generally in a plane at a fixed angle with respect to the first axis when the bolt runner is turning the bolts whereby the rocker arm assembly is installed to the engine cylinder bank in alignment with the respective push rod and the valve spring.

It is an object of the present invention to provide a tooling device for a robot or like to install at least two separate rocker arm assemblies, each assembly including a rocker arm with a dimpled end, pivot joint and bolt, onto an engine cylinder bank with valve springs, push rods and threaded apertures, the tooling device including a frame having means of connection with the robot or like, at least two subframes connected with the frame, a first jaw fixably connected to each respective subframes spring biased in a generally horizontal direction for gripping the dimpled end of the rocker arm, an actuator powered second jaw connected to each respective subframe movable with respect to the first jaw for gripping an end of the rocker arm opposite the dimpled end, the second jaw having slight angular compliance with the subframe, a bolt runner connected with each respective subframe for turning the bolt in a first axis, and the bolt runner having a sensor for detecting the presence and/or proper orientation of the bolt, means to vary the distance between the subframes further including a sensor to verify the distance between the subframes, and floating means for each of the respective subframe allowing the respective subframes to angularly float in a plane generally perpendicular to the first axis when the respective bolt runners are turning the respective bolts whereby the respective rocker arm assemblies are installed onto the engine cylinder banks in alignment with the respective push rods and the valve springs independent of one another.

It is an object of the present invention to provide a method of installing a rocker arm assembly which includes a rocker arm, pivot joint and bolt onto an engine cylinder bank with a valve spring, push rod and an aperture, the method including connecting with a robot or like a tooling device having a frame, gripping the rocker arm assemblies with first and second jaws connected with the frame by bringing the jaws towards one another, turning about a first axis the bolt with a bolt runner connected with the frame, and angularly floating the first and second jaws in a plane generally fixed with respect to the first axis whereby the bolt runner torques the bolt into the aperture and the rocker arm comes into alignment with the push rod and the valve spring.

Other objects, desires and advantages of the present invention will become more apparent to those skilled in the art as the nature of the invention is better understood from the accompanying drawings and a detailed description.

DETAILED DESCRIPTION OF THE DRAWINGS

Figure 1:
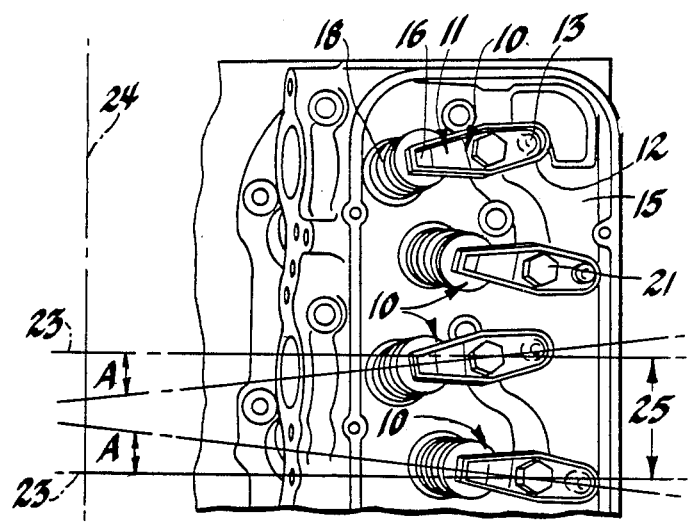
FIG. 1 is a fragmentary perspective view of an engine cylinder bank with installed rocker arm assemblies.
Figure 2:
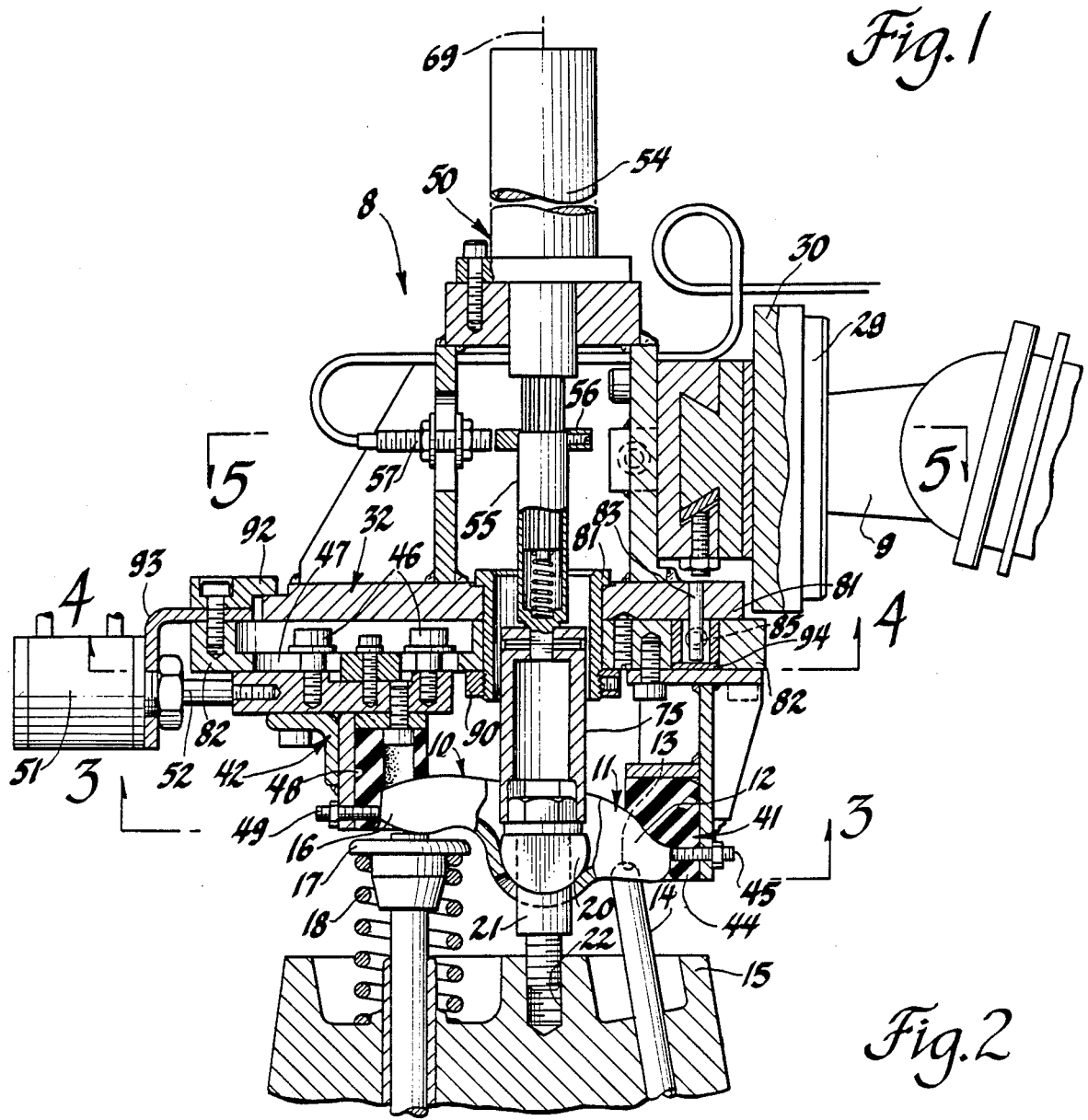
FIG. 2 is a front sectional view with a portion cut away of a preferred embodiment tooling device of the present invention.
Figure 3:
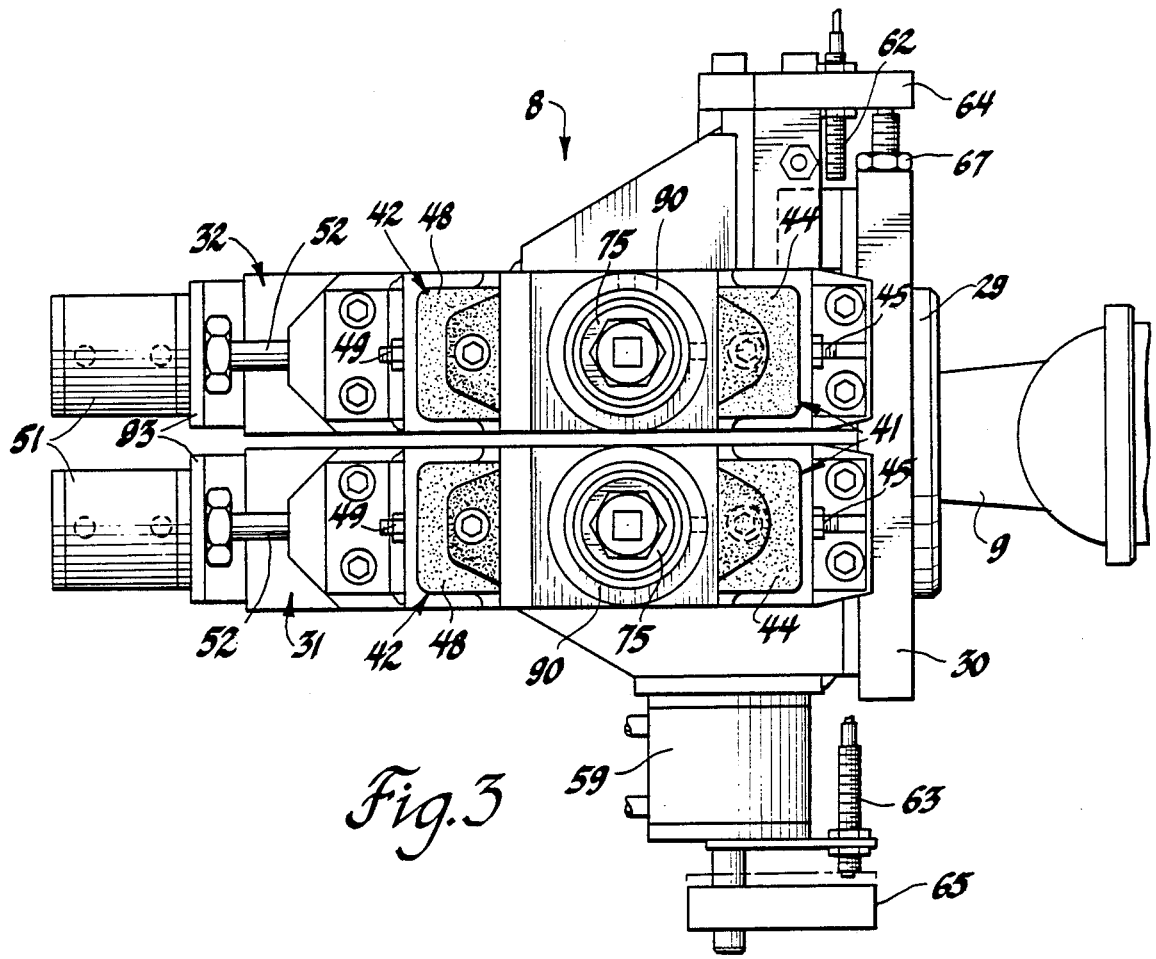
FIG. 3 is a view taken along line 3—3 of FIG. 2.

Referring to FIGS. 1 and 2, rocker arm assemblies 10 have three major parts. The first part is a rocker arm 11 which has a first end 12 with a dimple 13 which is mated and aligned over the push rod 14 of the engine cylinder bank 15. Opposite the first end 12, the rocker arm 11 has a second end 16 which is aligned over a valve flange 17 which is in turn mounted on valve spring 18. Resting in a nest of the rocker arm 11 is the pivot joint 20. Through a central aperture of the pivot joint 20 and a slot of the rocker arm 11 there is projected a bolt 21 which is threadably inserted into a threaded aperture 22 of the engine cylinder bank 15 attaching the rocker arm assembly 11 to the engine cylinder bank 15.

Typically an engine cylinder bank 15 will have the rocker arms assemblies 10 at a slight angle with a line 23 perpendicular to the axial center line 24 of the cam shaft. The offset angle A which the rocker arm assembly 10 is off from perpendicular line 23 will typically vary for each rocker arm assembly 10. Also, the rocker arm assemblies 10 will typically be in banks of two (for two valve per cylinder engines) and the spacing 25 between the various rocker arm assemblies 10 will vary for different cylinders.

Referring additionally to FIGS. 3–6, the tooling device 8 of the present invention is provided with a main frame 30 with means of connection 29 with robot 9. Fixed with the main frame 30 are first 31 and second 32 subframes. Each subframe includes a first 41 and second 42 jaw assembly along with a bolt runner 50. The bolt runner 50 turns the bolt 21 along a first axis 69.

Figure 7:
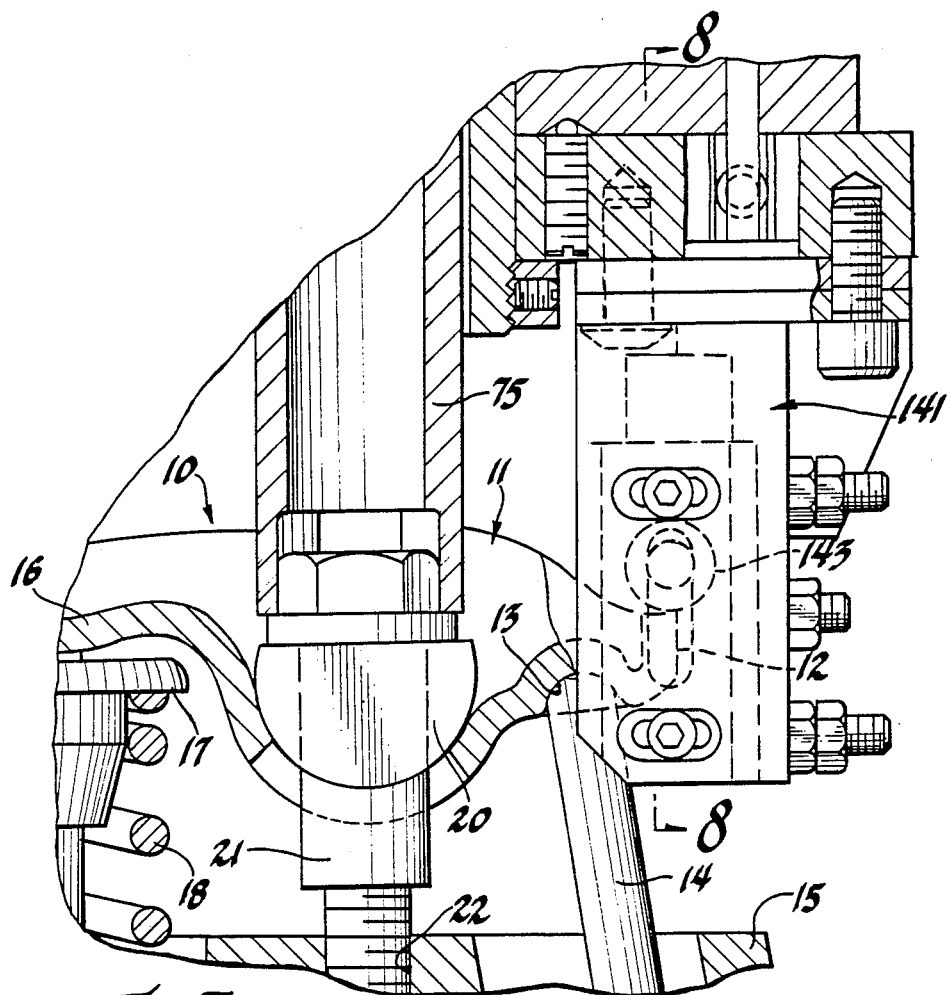
FIG. 7 is a front sectional view mainly in front elevation of an alternative first jaw assembly.
Figure 8:
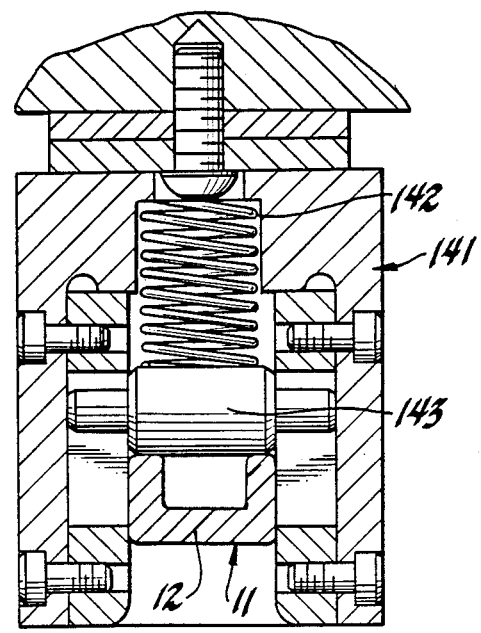
FIG. 8 is a line taken along line 8—8 of FIG. 7.

The first jaw assembly 41 has a rubber bumper 44 for gripping contact with the rocker arm first end 12. A set screw 45 provides a rigid reference point. Referring to FIGS. 7 and 8, an alternative first jaw assembly 141 has a spring 142 biased roller 143 to make contact with the rocker arm first end 12, providing vertical compliance with respect to the frame 30.

To grip the rocker arm assembly 10, on the rocker arm second end 16 there is the second jaw assembly 42. The second jaw assembly 42 is slidably mounted by two bolts 46 which ride in a slot 47 of the subframe 31 and is allowed slight angular compliance with respect to the subframe 31. The second jaw assembly 42 is also provided with a rubber bumper 48 for gripping contact with rocker arm 11. Also set screw 49 is provided to firmly fix the location of the rocker arm 11. Typically the second jaw assembly 42 will not require compliance in the vertical direction. Powering and attached with the second jaw assembly 42 is a pancake type cylinder actuator 51 and rod 52 which provides the means to move the second jaw assembly 42 towards the first jaw assembly 41 to grip the rocker arm 11.

Between the first 41 and second 42 jaw assemblies is a bolt runner 50. The bolt runner 50 has an air motor 54. While the first 41 and second 42 jaw assemblies grip the rocker arm assembly 10, a nut runner shaft 55 is spring loaded downward to make contact with the bolt 21. A flange 56 on the bolt runner shaft 55 excites a sensor 57. The position of the flange allows the sensor 57 to verify the presence and proper orientation of the bolt 21. The above verification will also confirm the presence of the rocker arm 11 and the pivot joint 20.

Figure 4:
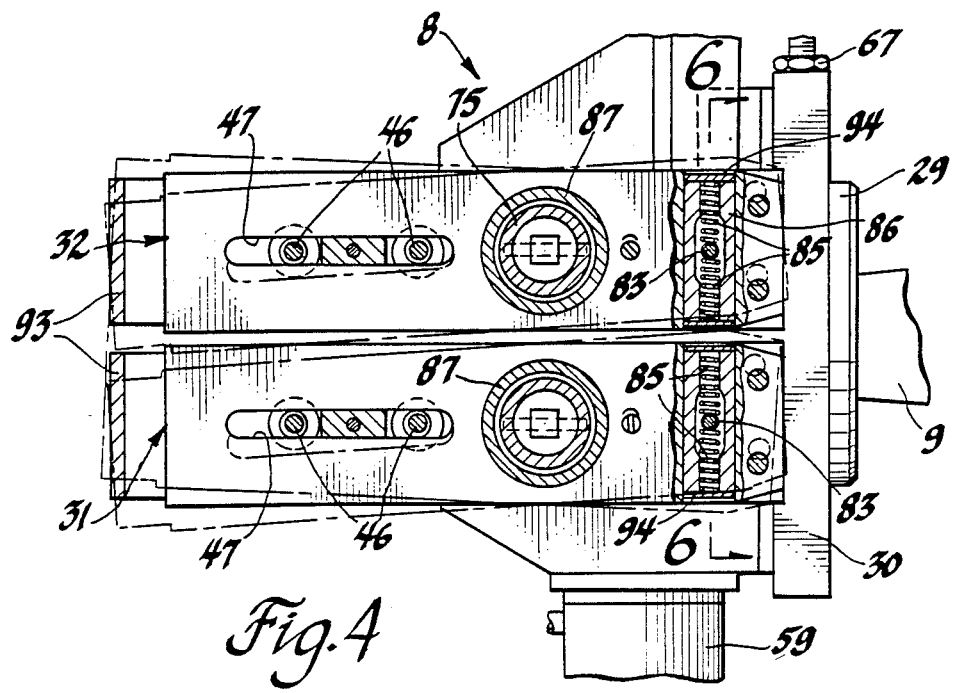
FIG. 4 is a view taken along line 4—4 of FIG. 2.
Figure 5:
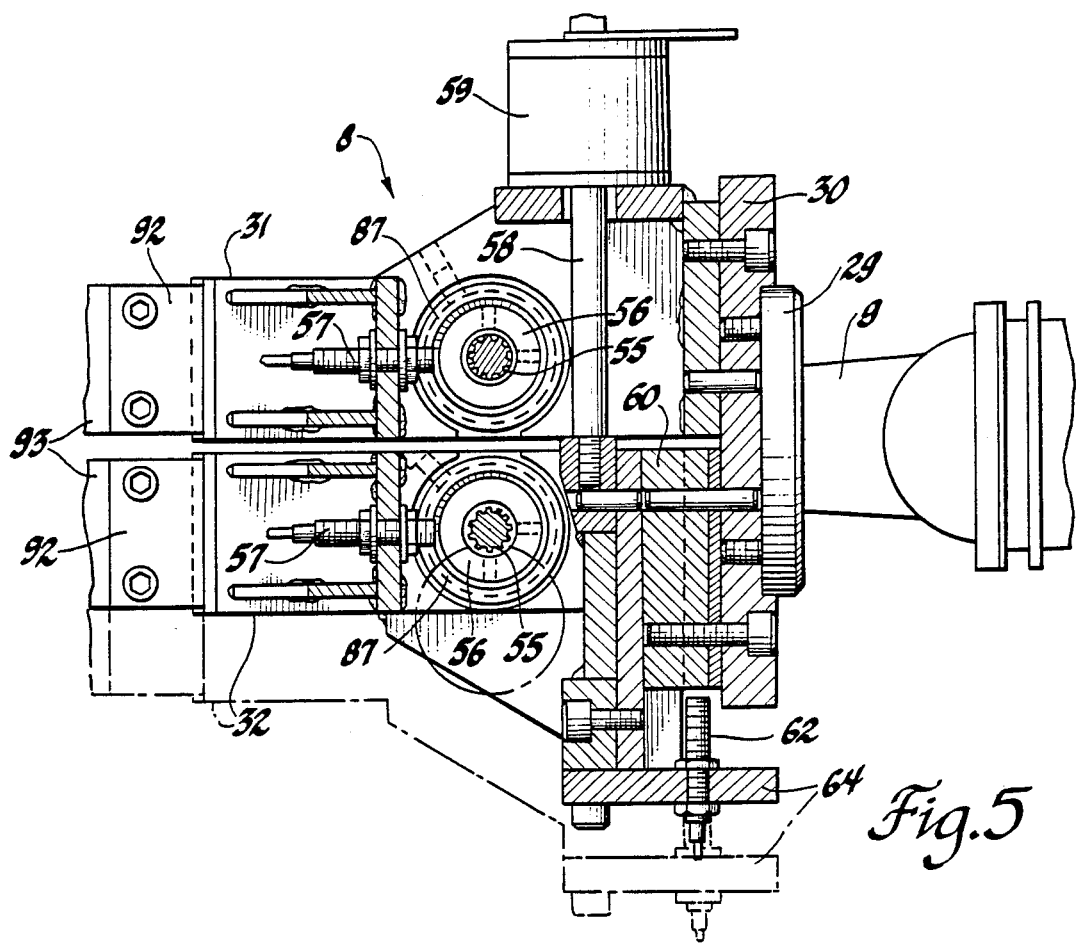
FIG. 5 is a view taken along line 5—5 of FIG. 2.

First subframe 31 is fixably connected with the main frame 30. The second subframe 32 is slidably mounted to the main frame 30 via first subframe 31 and a threaded connection with a piston rod 58 (FIGS. 4 and 5). Piston rod 58 is powered by pancake cylinder 59. Pancake cylinder 59 is fixably connected with plate 60 which is also fixably attached with main frame 30. The distance of second subframe 32 with respect to the first subframe 31 can be adjusted to vary the distance 25 (FIG. 1) between the installed rocker arm assemblies 10 (phantom FIG. 5). Sensor 62 or 63 provides verification of the location of flange 64 or 65 respectively to determine the proper position of the second subframe 32 with respect to the first subframe 31. Sensor 63 confirms the location of subframe 32 at a maximum distance 25 away from subframe 31. Sensor 62 confirms the location of subframe 32 at a minimum distance 25 away from subframe 31. Set screw 67 is utilized to set the minimum distance 25. Another set screw (not shown) is utilized to set the maximum distance 25. The use of sensors for minimum and maximum values of distance 25 verifies that the second subframe 32 is in the proper position and is not in a position intermediate of the minimum and maximum predetermined positions desired.

In operation, the tooling device 8 is transferred to loading station presentation tray (not shown) and is positioned over two rocker arm assemblies 10 with both of the first jaw assemblies 41 over the two rocker arms 10 towards their dimpled ends 12. Cylinders 51 are then activated to move the second jaw assemblies 42 towards the first jaw assemblies 41 to grip the rocker arm assemblies 10. During gripping of the rocker arm assemblies 10, the spring loaded bolt runner 50 shaft 55 will be pushed upward and the flange 56 will verify the proper positioning and orientation of the bolts 21. The tooling device 8 will then be carried by the robot 9 or like to position generally above the engine cylinder banks 15. The tooling device 8 then positions the subframes 32 to the desired installation distance 25 away from subframe 31 by activation of cylinder 59.

After the tooling device 8 is properly positioned over the engine cylinder bank 15 bolt runner 50 will start torquing the bolts 21 into the cylinder bank threaded apertures 22 along first axis 69. The spring 142 biased first jaw assemblies 141 (alternative embodiment FIGS. 7, 8) roller 143 pushes down on the first end 12 of the rocker arm 11 allowing the second end 12 of the rocker arm 11 to properly seat on push rod 14 regardless of push rods 14 extension with respect to the top surface of cylinder bank 15 (determined by the angular orientation of the crank shaft (not shown)).

Figure 6:
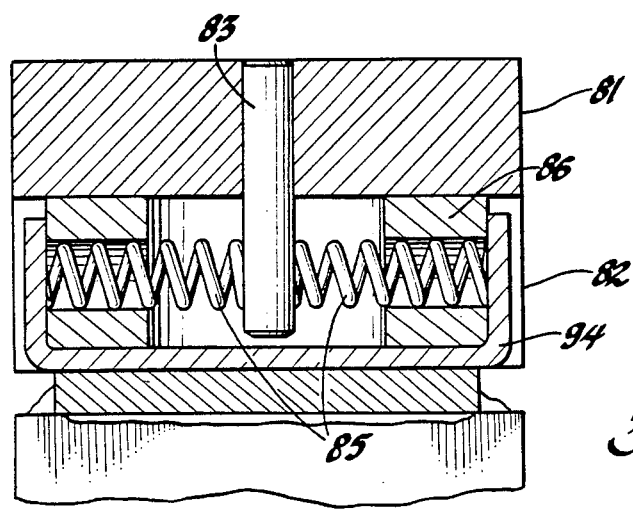
FIG. 6 is a view taken along line 6—6 of FIG. 4.

Referring to FIGS. 2, 4 and 6, subframe 32 is connected to mainframe 30 via a slide plate 60. As mentioned previously, subframe 32 may be moved transversely with respect of subframe 31 by extension of rod 58. Subframe 32 has a generally horizontal plate 81 with a downward projecting pin 83. Subframe 32 also has another plate 82 held to the plate 81 by a washer 90 and a flange clamp 92. Plate 82 is pivotally mounted on a bushing 87 to provide the means allowing plate 82 to angularly float with respect to plate 81. Angle member 93 suspends cylinder 51 from plate 82 and the slidable second jaw assembly 42 is suspended from plate 82 by bolts 46. Plate 82 has about 20° angular float (10° either side from a neutral position) or compliance in a generally fixed perpendicular plane with respect to first axis 69. Springs 85 captured between ear plate 94 and pin 83, bias plate 82 to a neutral position. Holes in plate 86 are provided to hold springs 85.

When the bolt runner 50 torques bolt 21 downward the contact of the push rod 14 with the rocker arm dimple 13 will cam the rocker arm 11 into alignment with the push rod 14 and the valve spring 18. The bolt runner 50 will be allowed to operate to a predetermined torque value whereupon after reaching the predetermined torque value the bolt runner 50 will stop. The second jaw assemblies 42 will release the rocker arm 11. The tooling device 8 can now be returned to the tray presentation area to pick up two additional rocker arm assemblies. Second jaw assembly 42 due to the fit of bolts 46 in slot 47 of plate 82 also has slight relative movement with plate 82, which aids in the alignment of the rocker arm 11 with the valve spring 18 and push rod 14.

The angular compliance of plate 82 in relation to the main frame 30 allows the robot 9 or like to install two rocker arm assemblies 10 at the same time. Without an angular float only one rocker arm assembly 10 at a time can be installed since the rocker arm assemblies are often not parallel with one another as described previously. In like manner, plate 82 of subframe 31 has angular float. The angular compliance of the first and second subframes 31 and 32 are independent of one another.

Another advantage of the angular float is that the robot 9 or the like only has to locate the bolt 21 with the threaded aperture 22 of the cylinder bank. Without the float the robot 9 would have to orientate the rocker arm assembly 10 to the proper alignment with the valve spring 18 and push rod 14. To do the above would greatly complicate the software programming for the robot 9 or the like and would require a robot with a rotative wrist possibly requiring the use of a more expensive robot. Also the twisting of the robot wrist could take up additional time slowing cycle time.

Thus far the present invention has been described in the embodiment of a two rocker arm assembly tool. However, the present invention is not limited to assembly tools with two or fewer rocker assembly arms.

The present invention provides a method of installing a rocker arm assembly 10 which include a rocker arm 11, pivot joint 20 and bolt 21 onto an engine cylinder bank 15 with a valve spring 18, push rod 14 and an aperture 22, the method including the following steps:

1. Connecting with a robot 9 or like a tooling device 8 having a frame 30;
2. Gripping the rocker arm assembly 10 with first 41 and second 42 jaws connected with the frame 30 by bringing the jaws towards one another;
3. Turning about a first axis 69 the bolt 21 with a bolt runner 50 connected with the frame 30; and
4. Angularly floating the first 41 and second jaws 42 in a plane generally fixed with respect to the first axis 69 whereby the bolt runner 50 torques the bolt 21 into the aperture 22 and the rocker arm 11 comes into alignment with the push rod 14 and the valve spring 18.

While embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A tooling device for a robot or like to install a rocker arm assembly onto an engine cylinder bank with a valve spring, a push rod and an aperture, said rocker arm assembly including a rocker arm, pivot joint and bolt, said tooling device comprising in combination:
   a frame having means of connection with said robot or like,
   a first jaw connected to said frame for gripping a first end of said rocker arm,
   a second jaw movable with respect to said first jaw for gripping an end of said rocker arm opposite said first end;
   a bolt runner connected with said frame for turning said respective bolt in a first axis;
   and floating means allowing said frame to angularly float generally in a plane at a fixed angle with respect to said first axis when said bolt runner is turning said bolts, whereby said rocker arm assembly is installed to said engine cylinder bank in alignment with said respective push rod and said valve spring.

2. A tooling device as described in claim 1 wherein said rocker arm first end has a dimple to mate with said push rod and said first jaw has compliance in a generally vertical direction with respect to said frame.

3. A tooling device as described in claim 1 wherein said bolt runner also includes a sensor to sense the position of said bolt allowing said tooling device to confirm the presence of said bolt and/or the proper orientation of said bolt in said rocker arm assembly.

4. A tool as described in claim 1 having a subframe with a second set of first and second jaws, bolt runner and floating means allowing said tooling device to simultaneously install a second rocker arm assembly to said engine cylinder bank in alignment with a respective valve spring and push rod.

5. A tooling device as described in claim 4 further including means to vary the distance between said first and second rocker arm assemblies.

6. A tool as described in claim 5 further including a sensor for detecting the distance between said first and second rocker arm assemblies.

7. A tooling device as described in claim 1 wherein said second jaw grips an end of said rocker arm assembly installed adjacent said valve spring and wherein said second jaw has slight angular compliance with respect to said frame independent of said float means.

8. A tooling device for a robot or like to install at least two separate rocker arm assemblies, each assembly including a rocker arm with a dimpled end, pivot joint and bolt, onto an engine cylinder bank with valve springs, push rods and threaded apertures, said tooling device comprising in combination:
   a frame having means of connection with said robot or like,
   at least two subframes connected with said frame;

a first jaw fixably connected to each respective subframe spring biased in a generally horizontal direction for gripping said dimpled end of said rocker arm, an actuator powered second jaw connected to each respective subframe movable with respect to said first jaw for gripping an end of said rocker arm opposite said dimpled end, said second jaw having slight angular compliance with said subframe;

a bolt runner connected with each respective subframe for turning said bolt in a first axis, and said bolt runner having a sensor for detecting the presence and/or proper orientation of said bolt;

means to vary the distance between the said subframes further including a sensor to verify the distance between said subframes; and floating means for each said respective subframe allowing said respective subframe to angularly float in a plane generally perpendicular to said first axis when said respective bolt runners are turning said respective bolts whereby said respective rocker arm assemblies are installed onto said engine cylinder banks in alignment with said respective push rods and said valve springs independent of one another.

9. A method of installing a rocker arm assembly which include a rocker arm, pivot joint and bolt onto an engine cylinder bank with a valve spring, push rod and an aperture, said method in combination comprising:

connecting with a robot or like a tooling device having a frame;

gripping said rocker arm assemblies with first and second jaws connected with said frame by bringing said jaws towards one another;

turning about a first axis said bolt with a bolt runner connected with said frame; and angularly floating said first and second jaws in a plane generally fixed with respect to said first axis whereby said bolt runner torques said bolt into said aperture and said rocker arm comes into alignment with said push rod and said valve spring.

* * * * *